(12) United States Patent
Timbrell et al.

(10) Patent No.: US 11,668,490 B2
(45) Date of Patent: Jun. 6, 2023

(54) VENTILATION LOUVER

(71) Applicant: C SERIES AIRCRAFT LIMITED PARTNERSHIP, Mirabel (CA)

(72) Inventors: Dean Martin Timbrell, Williamstown (CA); Jean-Guy Gaudreau, St. Bernardin (CA)

(73) Assignees: BOMBARDIER INC., Dorval (CA); AIRBUS CANADA LIMITED PARTNERSHIP, Mirabel (CA)

( * ) Notice: Subject to any disclaimer, the term of this patent is extended or adjusted under 35 U.S.C. 154(b) by 1137 days.

(21) Appl. No.: 16/308,614

(22) PCT Filed: Jun. 9, 2017

(86) PCT No.: PCT/US2017/036735
§ 371 (c)(1),
(2) Date: Dec. 10, 2018

(87) PCT Pub. No.: WO2017/218332
PCT Pub. Date: Dec. 21, 2017

(65) Prior Publication Data
US 2019/0154297 A1 May 23, 2019

Related U.S. Application Data

(60) Provisional application No. 62/350,081, filed on Jun. 14, 2016.

(51) Int. Cl.
*F24F 13/08* (2006.01)
*B64C 7/00* (2006.01)
(Continued)

(52) U.S. Cl.
CPC .............. *F24F 13/084* (2013.01); *A62C 3/08* (2013.01); *B64C 7/00* (2013.01); *F24F 11/33* (2018.01);
(Continued)

(58) Field of Classification Search
CPC ........ F24F 13/082; F24F 13/084; F24F 11/33; A62C 3/08; A62C 4/00; B64C 7/00; B64D 2045/009
(Continued)

(56) References Cited

U.S. PATENT DOCUMENTS 5,120,273 A * 6/1992 Lin .......................... F24F 13/18
454/212
6,494,780 B1 12/2002 Norbury
(Continued)

FOREIGN PATENT DOCUMENTS

| EP | 2899126 A1 | 7/2015 |
|---|---|---|
| GB | 2443841 A | 5/2008 |
| JP | 2013221708 A | 10/2013 |

OTHER PUBLICATIONS

PCT International Search Report and Written Opinion dated Aug. 23, 2017, re: International Application No. PCT/US2017/036735.
(Continued)

*Primary Examiner* — Avinash A Savani
*Assistant Examiner* — Dana K Tighe
(74) *Attorney, Agent, or Firm* — Norton Rose Fulbright Canada LLP (57) ABSTRACT

A ventilation louver (10) includes a first plate (52) defining a first opening (74) therein for permitting fluid flow along a first direction (128), a second plate (54) defining a vane (82) therein, the vane at least partially covering the first opening and directing the fluid flow along a second direction (130), non-parallel to the first direction, and a third plate (56) defining a louvered opening (108) therein wherein the louvered opening directs fluid flow along a third direction (138), non-parallel to both the first direction and the second direction. In a non-limiting example, the ventilation louver may be disposed in a belly fairing of an aircraft.

20 Claims, 4 Drawing Sheets (51) Int. Cl.
*A62C 3/08* (2006.01)
*F24F 11/33* (2018.01)
*B64D 45/00* (2006.01)
*A62C 4/00* (2006.01)

(52) U.S. Cl.
CPC .............. *F24F 13/082* (2013.01); *A62C 4/00* (2013.01); *B64D 2045/009* (2013.01)

(58) Field of Classification Search
USPC .......................................................... 454/76
See application file for complete search history.

(56) References Cited

U.S. PATENT DOCUMENTS

| | | | |
|---|---|---|---|
| 6,746,324 B2 * | 6/2004 | Achen .................... | F24F 13/082 |
| | | | 454/283 |
| 8,651,924 B1 | 2/2014 | Jones et al. | |
| 2013/0048794 A1 * | 2/2013 | Wood .................... | B64C 21/025 |
| | | | 244/200 |
| 2015/0211755 A1 * | 7/2015 | Richardson ............ | B64D 13/04 |
| | | | 454/255 |
| 2017/0129588 A1 * | 5/2017 | Verillion, Jr. ............. | B64C 1/10 |

OTHER PUBLICATIONS

English translation of patent document No. JP 2013221708 dated Oct. 28, 2013, https://patents.google.com/patent/JP2013221708A/en, accessed on Nov. 29, 2018.

* cited by examiner

VENTILATION LOUVER

CROSS-REFERENCE TO RELATED APPLICATION(S)

The present application is a national phase application under 35 U.S.C. 371 of International Patent Application No. PCT/US2017/036735 filed on Jun. 9, 2017, which claims priority from U.S. Provisional Patent Application Ser. No. 62/350,081, entitled "VENTILATION LOUVER," filed Jun. 14, 2016, the entire contents of which are incorporated herein by reference.

FIELD OF THE INVENTION

The present invention concerns a ventilation louver for an aircraft. More specifically, the present invention concerns a ventilation louver disposed in the belly fairing of an aircraft that is configured to equalize the pressure within the belly fairing with atmospheric pressure. In addition, the present invention concerns a ventilation louver that also helps to delay the progression of a fire into a compartment encompassed by a belly fairing located beneath the aircraft's fuselage.

DESCRIPTION OF THE BACKGROUND AND RELATED ART

As should be apparent to those skilled in the art, fire safety is a significant concern for the design of an aircraft.

Aircraft designers engineer several features into aircraft to increase the survivability of a fire. For example, aircraft designers incorporate fire retardant materials into the aircraft to slow the progression of a fire within the cabin of the aircraft. In addition, aircraft designers incorporate physical barriers within the structure of the aircraft to impede the movement of fire in and through the aircraft.

Aircraft designers also incorporate features into an aircraft to slow the ingress of fire from a location external to the aircraft. As such, if there is an external fire, such as a ground fire, the aircraft incorporates barriers to slow the fire from entering the cabin, thereby increasing the time provided for passengers to exit from the aircraft.

As should be apparent to those skilled in the art, there are regulations that define the minimum predetermined period of time during which an external fire should not penetrate the fuselage.

In view of a desire for ever more safe aircraft, a need for simple and efficient devices and components for ensuring compliance with fire safety regulations has arisen.

SUMMARY OF THE INVENTION

The present invention addresses one or more of the deficiencies with respect to the prior art.

In particular, the present invention provides a ventilation louver that includes a first plate defining a first opening therein for permitting fluid flow along a first direction, a second plate defining a vane therein, the vane at least partially covering the first opening and directing the fluid flow along a second direction, non-parallel to the first direction, and a third plate defining a louvered opening therein wherein the louvered opening directs fluid flow along a third direction, non-parallel to both the first direction and the second direction.

In one contemplated embodiment of the ventilation louver, the third direction is substantially perpendicular to the first direction.

In another contemplated embodiment, the ventilation louver also includes a frame with side walls. The frame connects the first plate to the third plate with the second plate being positioned between the first plate and the third plate. The side walls define a second opening therein for directing fluid flow along the third direction, non-parallel to both the first direction and the second direction.

Still further, the ventilation louver may be constructed where the first opening is a plurality of first openings.

The ventilation louver may be constructed so that the vane is a plurality of vanes.

In this embodiment, the plurality of vanes in the ventilation louver may be equal in number to the plurality of first openings.

It is contemplated that the louvered opening in the ventilation louver may encompass a plurality of louvered openings.

Additionally, for the ventilation louver, the second opening may encompass a plurality of second openings.

For the ventilation louver, it is contemplated that the first plate, the second plate, the third plate, and the frame may be rectangular.

Additionally, the first plate, the second plate, the third plate, and the frame of the ventilation louver may be made from steel.

It is contemplated that the ventilation louver may be disposable in a belly fairing of an aircraft.

The present invention also provides for a belly fairing for an aircraft that includes a body and a ventilation louver disposed in the body. The ventilation louver is contemplated to include a first plate defining a first opening therein for permitting fluid flow along a first direction, a second plate defining a vane therein, the vane at least partially covering the first opening and directing the fluid flow along a second direction, non-parallel to the first direction, and a third plate defining a louvered opening therein wherein the louvered opening directs fluid flow along a third direction, non-parallel to both the first direction and the second direction.

For the belly fairing, the third direction may be substantially perpendicular to the first direction.

It is also contemplated that the belly fairing may include a frame having side walls. The frame may connect the first plate to the third plate with the second plate being positioned between the first plate and the third plate. If so, the side walls may define a second opening therein for directing fluid flow along the third direction, non-parallel to both the first direction and the second direction.

For the belly fairing, it is contemplated that the first opening may encompass a plurality of first openings.

Still further, the vane in the belly fairing may encompass a plurality of vanes.

Additionally, for the belly fairing, the plurality of vanes is contemplated to be equal in number to the plurality of first openings.

Next, the belly fairing is contemplated to have a construction where the louvered opening encompasses a plurality of louvered openings.

In yet another contemplated embodiment of the belly fairing, the second opening may encompass a plurality of second openings.

For the belly fairing, it is contemplated that the first plate, the second plate, the third plate, and the frame may be rectangular.

Moreover, it is contemplated that the first plate, the second plate, the third plate, and the frame in the belly fairing may be made from steel.

The present invention also provides for a ventilation louver that includes a first component defining a first opening therein for directing fluid flow along a first direction, a second component defining a second configuration for directing fluid flow along a second direction, non-parallel to the first direction, and a third component defining a third configuration for directing fluid flow along a third direction, non-parallel to both the first direction and the second direction.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

Figure 1:
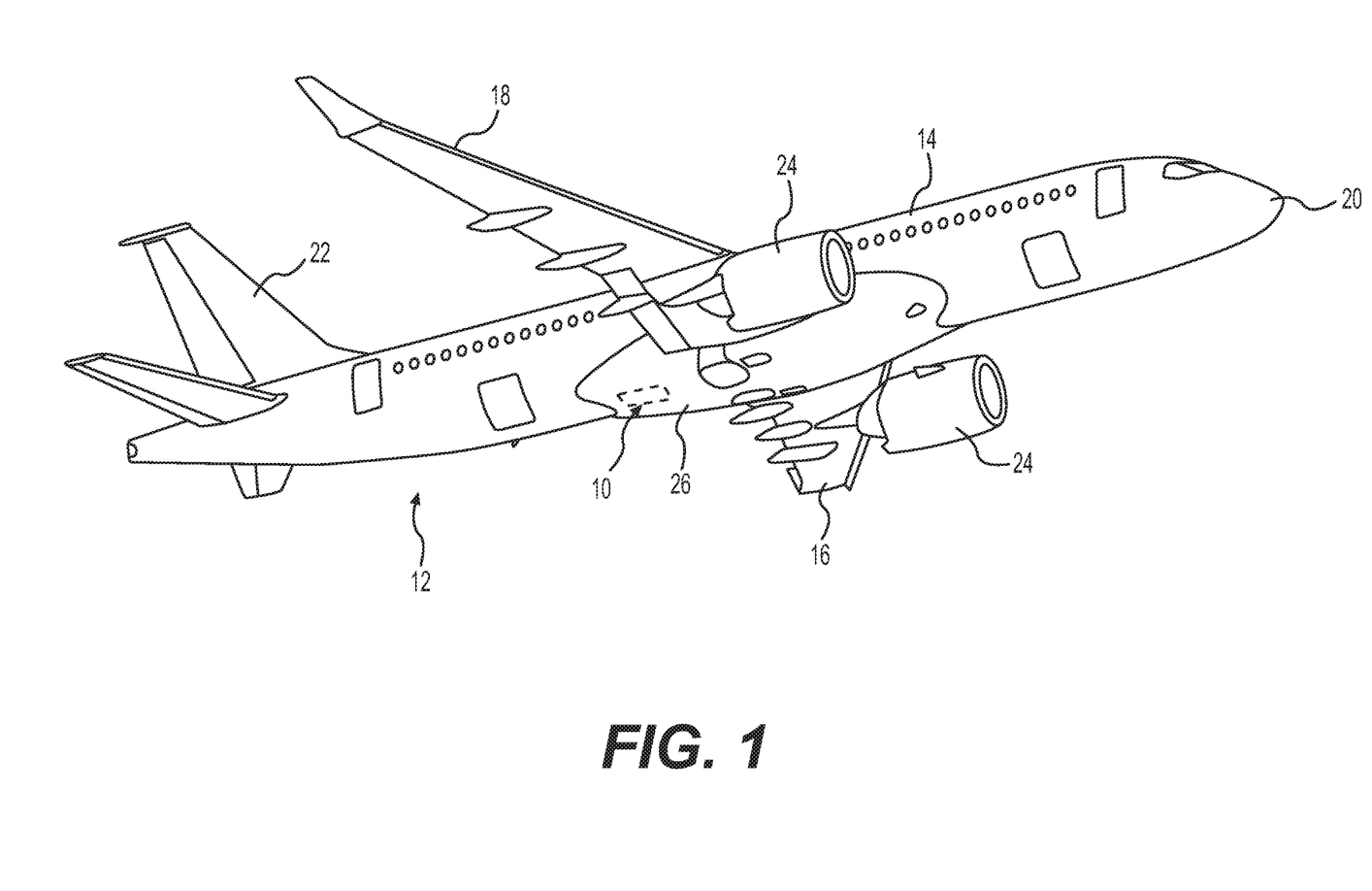
FIG. 1 is a perspective illustration of an aircraft from a bottom, starboard perspective, the aircraft being exemplary of the type of aircraft that is contemplated to incorporate the ventilation louver of the present invention.

FIG. 1 is a perspective view of an exemplary aircraft 12 which may comprise a belly fairing generally shown at 26, as will be described below. Aircraft 12 may be any type of aircraft such as corporate (e.g., business jet), private, commercial and passenger aircraft. For example, aircraft 12 may be a narrow-body, twin-engine jet airliner. Aircraft 12 may be a fixed-wing aircraft. Aircraft 12 may comprise wings 16, 18 including flight control surfaces (not shown), fuselage 14, engines 24 and empennage 22 of known or other type. One or more of engines 24 may be mounted to each of wings 16, 18. Alternatively, or in addition, one or more of engines 24 may be mounted to fuselage 14 or be installed on aircraft 12 in any suitable manner.

The present invention relates generally to a ventilation louver 10 located within the belly fairing 26 of aircraft 12. In some embodiments, the ventilation louver 10 provides a construction that delays fire penetration into the enclosure defined by the belly fairing 26, and as such into the fuselage 14.

In the discussion that follows, the ventilation louver 10 of the present invention will be described in connection with aircraft 12. However, the present invention should not be understood to be limited to aircraft 12 or to aircraft, generally. The ventilation louver 10 of the present invention may be employed on other vehicles including, for example, train cars and busses. Still further, the ventilation louver 10 of the present invention may be employed in civil engineering projects, such as houses and buildings.

The belly fairing 26, which is defined by a body, may cover structural elements of the aircraft 12 including, among other features, the landing gear for the aircraft 12. The belly fairing 26 is designed to establish a suitable, aerodynamic surface contour around the components enclosed thereby.

In the illustrated embodiment, the fuselage 14 of the aircraft 12 is contemplated to be made from aluminum or an alloy of aluminum and the belly fairing 26 is contemplated to be made from a composite material, such as a carbon fiber composite material.

During an external fire scenario, the composite belly fairing 26 may provide a temporary fire barrier for the aluminum fuselage 14, providing enough time for passenger evacuation. As will be described in more detail below, the ventilation louver 10 according to the present invention provides a structure that reduces flame energy and, thus, assists the composite belly fairing 26 in delaying fire penetration into the fuselage 14.

Figure 4:
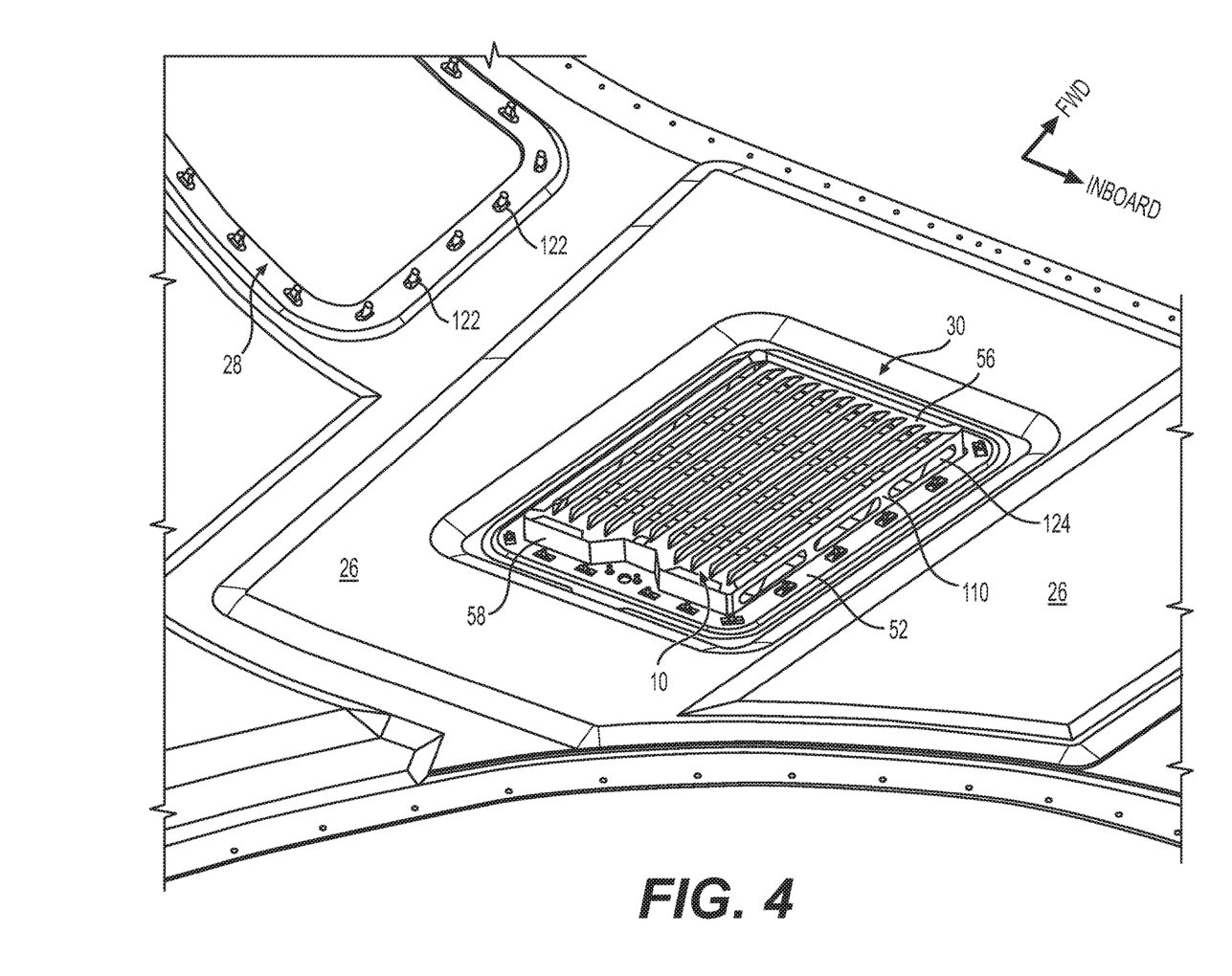
FIG. 4 is a perspective illustration of the ventilation louver of the present invention, showing one contemplated location for the installation of the louver within the belly fairing of the aircraft.

The ventilation louver 10 is provided in the belly fairing 26 in order to allow pressure equalization between fairing space and atmosphere and to allow system heat venting. FIG. 4, which is discussed in greater detail below, illustrates two openings 28, 30, which represent two possible locations for the ventilation louver 10 according to the present invention. The locations of the openings 28, 30 are not intended to limit the present invention.

As should be apparent to those skilled in the art, the two openings 28, 30 establish a pathway into and out of the compartment encompassed by the belly fairing 26 for permitting ventilation and pressure equalization.

Figure 2:
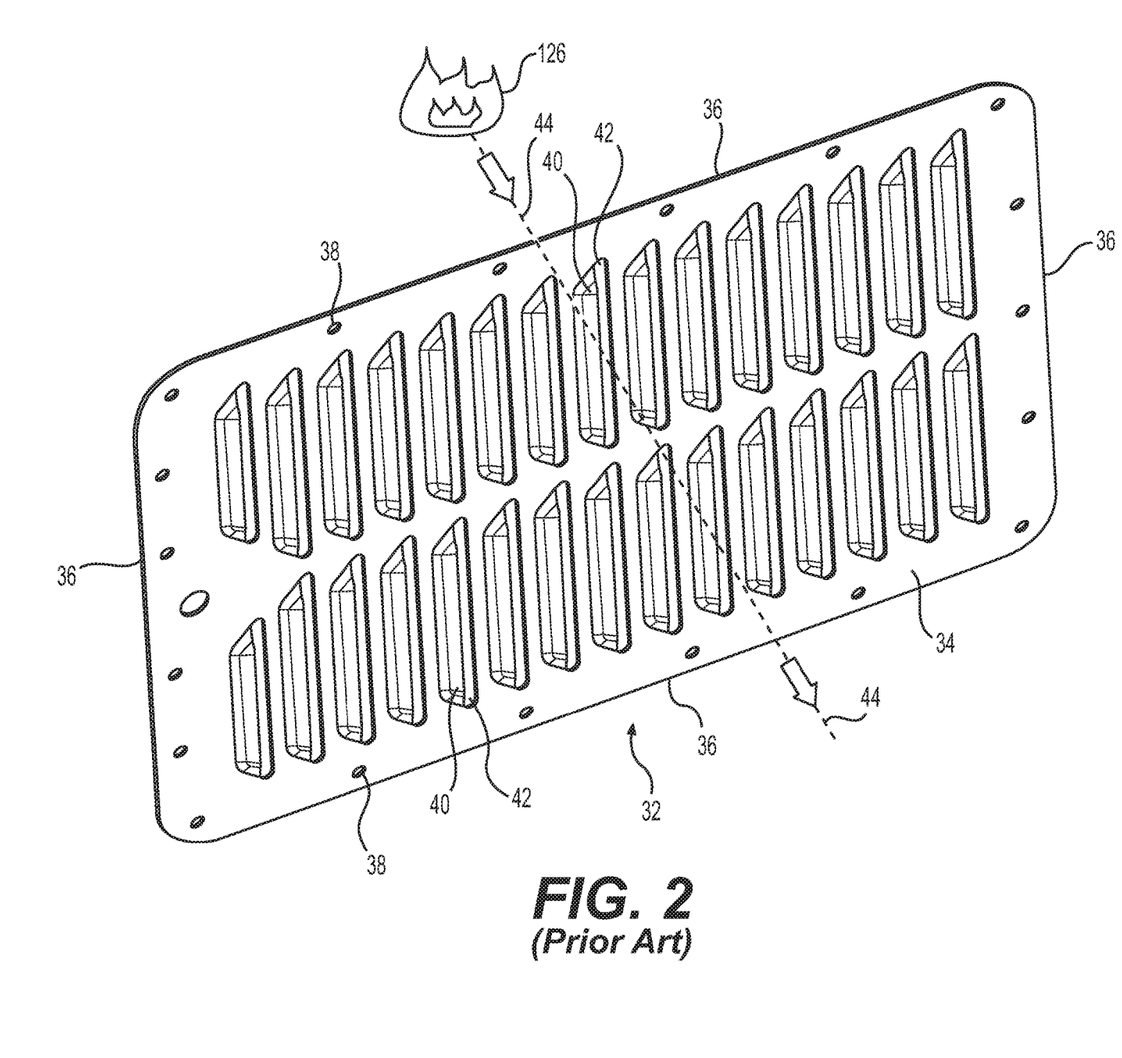
FIG. 2 is a perspective illustration of a ventilation louver of the type known in the prior art.

One example of a ventilation louver 32 according to the prior art is illustrated in FIG. 2. When addressing fire safety, the openings 28, 30 present an engineering challenge. While the openings 28, 30 facilitate pressure equalization and heat dissipation, the openings 28, 30 also potentially permit fire to creep from the exterior of the aircraft into the compartment enclosed by the belly fairing 26. In other words, in the event of an external fire 126, it is contemplated that the fire may enter into the compartment encapsulated by the belly fairing 26 through the ventilation louver 32, along a relatively direct path.

The ventilation louver 32 comprises a plate 34 with four sides 36 defining a periphery. The plate 34 includes a number of openings 38 that permit the plate 34 to be attached to the fuselage 14 via a plurality of fasteners, such as rivets or screws. The plate 34 includes a plurality of louvers 40. Each of the louvers 40 extends adjacent to and covers elongated openings 42. Each louver 40 establishes a relatively direct path 44 for the fire 126 to pass through the ventilation louver 32, thereby allowing the creep of the fire 126 into the interior of the fuselage 14.

As noted above, aircraft, such as the aircraft 12, are designed to incorporate features that retard the progression of a fire 126, thereby maximizing the survivability of such a fire 126 by passengers.

The ventilation louver 10 according to the present invention improves upon the ventilation louver 32 of the prior art by establishing a fire path 142, which is convoluted and tortuous by comparison with the direct path 44 illustrated in FIG. 2. For this reason, among others, the ventilation louver 10 of the present invention is better able to retard the progress of a fire 126 from an external source.

Figure 3:
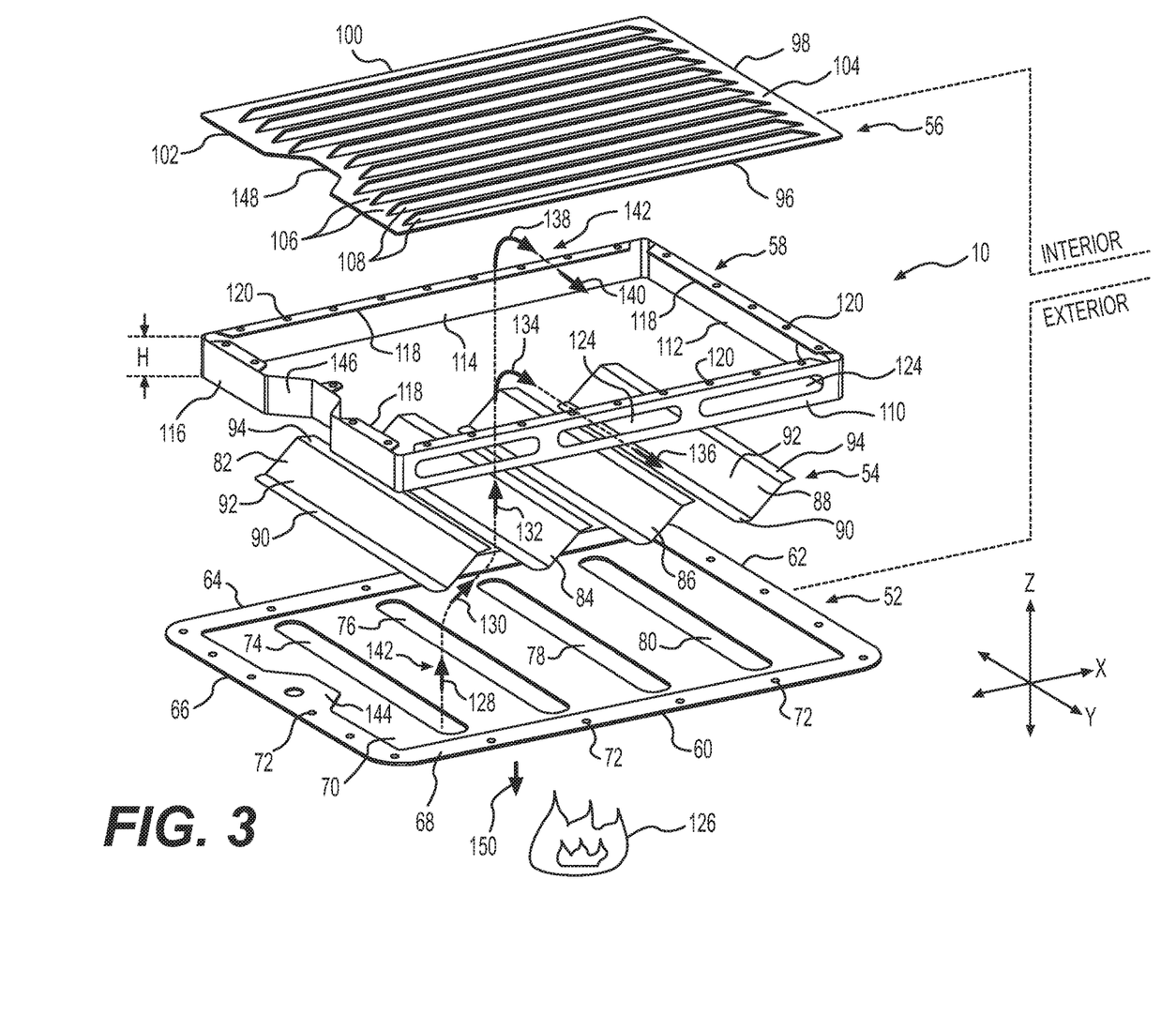
FIG. 3 is an exploded, perspective illustration of the ventilation louver according to the present invention.

FIG. 3 illustrates a fire 126 in relation to the ventilation louver 10 according to the present invention. As should be apparent to those skilled in the art, the term "fire" 126 refers to the energy produced as a result of the burning of a combustible material in the presence of oxygen from the air to produce light, heat, and combustion products.

As also should be apparent to those skilled in the art, a fire spreads through at least one of three different mechanisms. First, a fire may spread through conduction, which involves the transfer of energy (i.e., heat) by direct contact with a particular material. Second, a fire may spread through convection, which involves the transfer of heat through contact between heated gases (i.e., air) and an area cooler than the heated gases. Third, a fire may propagate though radiation, which is the transmission of heat via light (i.e., infrared radiation).

Fire 126 also "progresses" or "flows" in some ways like a liquid, because fire "follows" the source of fuel, including oxygen and the combustible materials. Therefore, to facilitate the discussion that follows, the movement of the fire 126 will be referred to as the "progression" or "flow" of the fire 126 from one location to another. The discussion of the progression or flow of the fire 126 is intended to encompass any of the mechanisms, including conduction, convection, and radiation, by which the fire 126 may spread.

As illustrated in FIG. 3, the ventilation louver 10 of the present invention includes a first plate 52, a second plate 54, a third plate 56, and a frame 58. Each of the first plate 52, the second plate 54, the third plate 56, and the frame 58 are contemplated to establish first, second, third, and fourth barriers, respectively, to the flow of fire 126 through the ventilation louver 10.

In the illustrated embodiment, the first plate 52, the second plate 54, the third plate 56, and the frame 58 are contemplated to be made from a metal, such as steel, because steel has a higher melting point than aluminum which is used in the fuselage structure. As a metal, steel also is resistant to combustion.

While steel is contemplated to be the primary material for the construction of the first plate 52, the second plate 54, the third plate 56, and the frame 58, other metals may be employed without departing from the scope of the present invention. Such other metals include, but are not limited to alloys of steel, iron, alloys of iron, brass, copper, alloys of copper, bronze, and the like.

Still further, the first plate 52, the second plate 54, the third plate 56, and the frame 58 may be made from non-metallic materials including ceramics, plastics, etc.

Separately, it is contemplated that each of the first plate 52, the second plate 54, the third plate 56, and the frame 58 will be constructed from the same material. However, the present invention does not require such a construction. It is contemplated that each of the first plate 52, the second plate 54, the third plate 56, and the frame 58 may be made from a different material, as required or as desired. In one contemplated embodiment, for example, the second plate 54 may be made from a ceramic material while the remaining elements of the ventilation louver 10 are made from steel.

It is noted that the terms "first," "second," and "third" are employed to facilitate reference to components of the ventilation louver 10. These appellations are not intended to be limiting of the present invention, nor are they intended to imply or require a specific order for the three plates 52, 54, 56. For example, the third plate 56 may be moved to the position of the first plate 52 and vice-versa without departing from the scope of the present invention. Moreover, it is contemplated that additional plates may be incorporated into the ventilation louver 10. For example, two of the second plates 54 may be positioned between the first plate 52 and the third plate 56 to offer still further fire protection.

With continued reference to FIG. 3, the first plate 52 may be a plate defining a periphery 68 that surrounds a central area 70. In the non-limiting embodiment shown, the first plate 52 is a rectangular plate that comprises four sides 60, 62, 64, 66, but it is to be understood that the first plate 52 may comprise any shape without departing from the present invention. The periphery 68 is contemplated to be thicker than the central area 70. The periphery includes a plurality of openings 72, which are contemplated to receive fasteners 122 so that the ventilation louver 10 may be affixed to the belly fairing 26. FIG. 4 illustrates a plurality of fasteners 122 surrounding the opening 28, for example. The central area 70 includes a plurality of elongate openings 74, 76, 78, 80 therethrough.

The first plate 52 is contemplated to be made from a metal material, such as steel, as discussed above. In particular, the first plate 52 is contemplated to be manufactured from a sheet of steel with the openings 72, 74, 76, 78, 80 being punched therethrough.

As should be apparent to those skilled in the art, the first plate 52 may be manufactured according to any alternative methodology. For example, the openings 72 may be drilled through the periphery 68. The elongate openings 74, 78, 78, 80 may be cut through the central area 70 by any suitable means including, but not limited to, a saw, bit, laser, high pressure water jet, or the like. As illustrated in FIG. 3, the first plate 52 is contemplated to be attached to the belly fairing 26 such that it is exposed to the outside environment.

The second plate 54 is illustrated as a combination of a plurality of vanes 82, 84, 86, 88. Although the second plate 54 is described as being a plate, it is to be understood that the plurality of vanes 82, 84, 86, 88 may each be independent components that are individually connected to plate 52.

In the illustrated embodiment, each of the plurality of vanes 82, 84, 86, 88 shares the same construction. In particular, each vane 82, 84, 86, 88 has a first flange 90, a diagonal portion 92, and a second flange 94. While the vanes 82, 84, 86, 88 are shown as having the same construction, this is not required to practice the present invention. To the contrary, the vanes 82, 84, 86, 88 may have different constructions from one another without departing from the scope of the present invention.

The vanes 82, 84, 86, 88 forming the second plate 54 are contemplated to extend from the first plate 52 in a direction towards the third plate 56. In the illustrated embodiment, the first flanges 90 of the vanes 82, 84, 86, 88 contact the top surface of the central area 70 of the first plate 52. The second flanges 94 of the vanes 82, 84, 86, 88 may contact the bottom surface of the third plate 56.

The plurality of vanes 82, 84, 86, 88 are contemplated to be disposed adjacent to each of the elongate openings 74, 76, 78, 80 respectively, such that the diagonal portions 90 and the second flanges 92 of the vanes 82, 84, 86, 88 extend over the elongate openings 74, 76, 78, 80. When viewed from the perspective of the third plate 56, therefore, the elongate openings 74, 76, 78, 80 are completely obscured by the vanes 82, 84, 86, 88.

With continued reference to the second plate 54, the plurality of vanes 82, 84, 86, 88 are shown as separate elements. However, the vanes 82, 84, 86, 88 need not be separate from one another. To the contrary, it is contemplated that the plurality of vanes 82, 84, 86, 88 may form a unitary construction. For example, it is contemplated that the plurality of vanes 82, 84, 86, 88 may be connected to one another via one or more peripheral frames and/or connectors.

In the illustrated embodiment, it is contemplated that the plurality of vanes 82, 84, 86, 88 are affixed to the first plate 52 to secure the plurality of vanes 82, 84, 86, 88 in relation to the plurality of elongate openings 74, 76, 78, 80. In this contemplated arrangement, the first flanges 90 of each of the plurality of vanes 82, 84, 86, 88 may be attached to the first plate 52 by any suitable means including, but not limited to, welding, tack welding, brazing, riveting, and fastening by any suitable fastener such as a threaded fastener. While welding or tack welding are contemplated to be suitable for attaching the plurality of vanes 82, 84, 86, 88 to the first plate 52, the present invention should not be understood to be limited solely to such a construction.

The plurality of vanes 82, 84, 86, 88 are contemplated to be stamped and/or molded from steel, as discussed above. However, as also mentioned, the vanes 82, 84, 86, 88 need not be stamped or molded from steel. In one alternative embodiment, the vanes 82, 84, 86, 88 may be made from an alternative heat-resistant material, such as ceramic.

With continued reference to FIG. 3, the third plate 56 is contemplated to be rectangular in shape and has four sides 96, 98, 100, 102. It should however be understood that other shapes are also contemplated and within the scope of the present invention. The four sides 96, 98, 100, 102 surround a louvered area 104 having a plurality of louvers 106 and openings 108. Each of the louvers 106 is associated with an opening 108. As illustrated in FIG. 3, the louvers 106 and the openings 108 extend nearly the entire width of the third plate 56.

It is noted that the shape, length, and distribution of the louvers 106 and the openings 108 is not intended to be limited to the construction illustrated in FIG. 3. The louvers 106 and openings 108 may be placed at any suitable location and orientation on the third plate 56, as required or as desired. Moreover, the louvers 106 and the openings 108 need not extend the full width of the third plate 56. As should be apparent to those skilled in the art, there are numerous alternatives to the construction to the third plate 56 that may be employed without departing from the scope of the present invention.

In accordance with a non-limiting embodiment, the number of louvers 106 on third plate 56 may be greater than the number of openings 74, 76, 78, 80 on first plate 52. As such, the density of louvers 106 may be greater than the density of elongate openings 74, 76, 78, 80.

Like the first plate 52, the third plate 56 is contemplated to be stamped from a sheet of steel. As noted above, alternative materials may be employed without departing from the scope of the present invention.

Consistent with the first plate 52 and the third plate 56, the frame 58 is rectangular in shape. As should be apparent, the shape of the frame 58 is likely to compliment the shapes of the first plate 52 and the third plate 56. However, any suitable shape may be employed for the frame 58 without departing from the scope of the present invention.

The frame 58 has four sides 110, 112, 114, 116. The four sides 110, 112, 114, 116 define a predetermined height H. The height H may be the distance between the first plate 52 and the third plate 56. The height H may also define the height (or approximate height) of the vanes 82, 84, 86, 88 forming the second plate 54. Alternatively the height H may be different from the approximate height of the vanes 82, 84, 86, 88, such that a gap may be positioned between the flanges 94 of the vanes 82, 84, 86, 88 and the third plate 56.

Each of the sides 110, 112, 114, 116 includes flanges 118 at the top ends thereof. The flanges 118 includes openings 120. The openings 120 are contemplated to receive fasteners therein. In one contemplated embodiment, the openings 120 may be in register with the fasteners 122.

As illustrated in FIG. 4, the third plate 56 is contemplated to be sandwiched between the flanges 118 and the second plate 54. Accordingly, the third plate 56 does not include fastener openings, at least not for the illustrated embodiment. It is contemplated that the third plate 56 may be affixed to the frame 58 via welding, brazing, or the like. While not shown, the third plate 56 also may include openings to receive fasteners, including the fasteners 122.

With continued reference to FIG. 3, the side 110 of the frame 58 includes elongate openings 124. While three elongate openings 124 are illustrated, the frame 58 may include a fewer or a larger number of elongate openings 124, as required or as desired. Although only shown in one wall 110, it is to be understood that elongate openings may be provided in remaining sides 112, 114, 116 of the frame 58 as well.

In FIG. 3, the three directions X, Y, Z for a Cartesian coordinate system are provided to assist with a discussion of the manner in which the plates 52, 54, 56 and the frame 58 cooperate to slow the progress of the fire 126 through the ventilation louver 10. The location of the fire 126 is provided outside of the first plate 52. As noted above, the fire 126 is contemplated to be a ground fire 126 and, therefore, finds its origin exterior to the aircraft 12. The "exterior" and "interior" regions of the belly fairing 26 of the aircraft 12 are identified in FIG. 3, for reference.

As shown in FIG. 3, the fire 126 initially propagates in the direction indicated by the arrow 128. The arrow 128 is generally in a first direction, which is generally in direction of the Z-axis of the Cartesian coordinate system.

As should be apparent, the arrow 128 is generally in the direction of the Z-axis because the ventilation louver 10 generally extends along the plane defined by the X-axis and the Y-axis. This orientation, however, is not intended to limit the scope of the present invention. The ventilation louver 10 is contemplated to be effective regardless of its angular position with respect to the X-axis, the Y-axis, and/or the Z-axis.

With reference to FIG. 3, the first plate 52 establishes a first barrier to the fire 126 to slow the progression or flow of the fire 126 from the exterior of the belly fairing 26 to the interior of the belly fairing 26. In particular, since the first plate 52 is contemplated to be made from metal, the first plate 52 acts as a mirror, at least with respect to radiant energy, to reflect the heat from the fire 126 in the direction of the arrow 150.

It is noted that the openings 74, 76, 78, 80 define lengths that are generally parallel to the Y-axis. As a result, in the illustrated embodiment of the ventilation louver 10, the openings 74, 76, 78, 80 are orthogonal to the arrow 128.

After passing through the first plate 52, the fire 126 reaches the second plate 54, which comprises vanes 82, 84, 86, 88. At this stage, the direction of the fire 126 is diverted along a second direction that is generally along the direction of the arrow 130. Specifically, the diagonal portions 92 of the vanes 82, 84, 85, 88 cause the fire 126 to be diverted in the direction of the X-axis. This diversion in the direction of the flame causes the energy of the fire to diminish as it begins its circuitous path through the ventilation louver 10. Energy from the fire 126 is lost when the energy is diverted in the direction of the arrow 130 by the vanes 82, 84, 86, 88. As a result, the strength of the fire 126 is diminished at the location of the arrow 130 by comparison with the strength of the fire 126 at the arrow 128.

The energy of the fire 126 is diverted a second time when the energy is redirected again in the direction of the Z-axis. This occurs at the location of the arrow 132 as a result of further interaction with the vanes 82, 84, 86, 88. As should be apparent, therefore, by redirecting the progression of the fire 126, the second plate 54 establishes a second barrier to the flow of the fire 126 through the ventilation louver 10.

From the location of the arrow 132, the energy of the fire 126 has two paths. First, the energy of the fire 126 may exit from the frame 58 through the elongate openings 124. This path is designated by the arrows 134, 136. Second, the energy of the fire 126 may exit through the louvers 106 on the third plate 56. This path is designated by the arrows 138, 140.

As is apparent from FIG. 3, if the energy of the fire 126 travels along the first path defined by the arrows 134, 136, the energy of the fire 126 is directed out of the side of the ventilation louver 10 through the elongate openings 124. If the energy of the fire 126 continues along the second path defined by the arrows 138, 140, the energy of the fire 126 exits through the third plate 56.

In either case, the energy of the fire 126 is further diminished from the magnitude at the location of the arrow 132. In particular, for each of the first path and the second path, the energy of the fire 126 is redirected from the Z-axis to a third direction, generally along the direction of the Y-axis, as indicated by the arrows 134, 138. As a result, the energy of the fire 126 at the arrows 136, 140 is less than the energy of the fire 126 at the arrow 132.

As should be apparent from the foregoing, therefore, the third plate 56 establishes a third barrier to the progression of the fire 126 through the ventilation louver 10, because it redirects the fire 126 along a different direction. Similarly, the frame 58 establishes a fourth barrier to the progression of the fire 126 through the ventilation louver 10 for the same reasons.

As the fire travels through the ventilation louver 10, it travels along a first direction generally along the Z axis (arrow 128), along a second direction generally in the direction of the X axis (arrow 130) and along a third direction generally along the Y axis (arrows 136 and 140). This changing of direction helps in diminishing the fire's energy and delaying its progression into the belly fairing compartment. The third direction is non-parallel to both the first direction and the second direction.

As should be apparent from the foregoing, the energy of the fire 126 is diminished at least in part because the energy of the fire 126 traverses a convoluted or tortuous path 142 from the first plate 52 to the third plate 56. The convoluted path 142 also avoids a direct path (such as the direct path 44 illustrated in connection with the prior art ventilation louver 32) from the first plate 52 to the third plate 56 and, thereby, prevents radiant energy from being transmitted through the ventilation louver 10. Regardless of the means for the progression of the fire, because of the convoluted path 142, the ingress of the fire 126 into the interior of the belly fairing 26 may be slowed.

With further reference to FIG. 3, the first plate 52 includes a trapezoidal area 144 extending inwardly from the side 66. The trapezoidal area 144 is a portion of the periphery 68 of the first plate 52. Similarly, the frame 58 includes a complimentary trapezoidal indentation 146 on the side 116. The third plate 56 includes a complimentary trapezoidal notch 148. Each of the trapezoidal area 144, the trapezoidal indentation 146, and the trapezoidal notch 148 are provided in the ventilation louver 10 to accommodate an obstruction specific to the aircraft 12. As should be apparent, the trapezoidal area 144, the trapezoidal indentation 146, and the trapezoidal notch 148 are optional elements of the ventilation louver 10.

As should be apparent from the foregoing, the ventilation louver 10 of the present invention is contemplated to have a rectangular shape. However, the ventilation louver 10 of the present invention may take any shape without departing from the scope of the present invention. Contemplated shapes include, but are not limited to, square, triangular, polygonal, circular, oval, elliptical, curved, and amorphous.

FIG. 4 is a perspective illustration of the ventilation louver 10 as it may appear when installed in the opening 30. For illustration purposes, the opening 28 excludes a ventilation louver 10.

With renewed reference to the convoluted path 142, it is noted that a portion of the energy of the fire 126 is reflected back at the fire 126 by the first plate 52 in the direction of the arrow 150. Accordingly, only a portion of the energy from the fire 126 enters into the ventilation louver 10 at its exterior or first side. As noted, the energy of the fire 126 is dissipated, because the travel direction of the energy is changed at four locations, the arrow 130, the arrow 132, the arrow 134 (first path), and the arrow 138 (second path). Therefore, if the energy from the fire 126 follows the first path, there are three deflections at the arrow 130, at the arrow 132, and at the arrow 134. If the energy from the fire 126 follows the second path, there also are three deflections at the arrow 130, at the arrow 134, and at the arrow 138.

As should be apparent from FIG. 3, the arrow 130 causes the energy to transition from the Z-axis to the X-axis. The arrow 132 causes the energy to transition from the X-axis to the Z-axis. The arrows 134 and 138 cause the energy to transition from the Z-axis to the Y-axis. Each of these changes involves a change in direction.

Since the X-, Y-, and Z-axes are not considered to be limiting of the present invention, it is noted that the three axes may be labeled more generically as the first coordinate axis or first direction, the second coordinate axis or second direction, and the third coordinate axis or third direction. Following this convention, the arrow causes the energy from the fire 126 to transition from the first coordinate axis to the second coordinate axis (or the first direction to the second direction). The arrow 132 causes the energy from the fire 126 to transition from the second coordinate axis back to the first coordinate axis (or the second direction to the first direction). The arrows 134 and 138 cause the energy from the fire 126 to transition from the first coordinate axis to the third coordinate axis (or the first direction to the third direction).

With continued reference to FIG. 3, specifically the third plate 56, it is noted that the total area of the openings 108 determines, at least in part, the amount of energy directed through the first path and through the second path. In particular, assuming all things being equal, if the area of the openings 108 is designed to be equal to the area of the third plate 56 that does not include openings 108, approximately half of the energy from the fire 126 would be expected to be directed through the first path. The remaining half of the energy from the fire 126 would then be directed through the second path.

Concerning the first plate 52, it is contemplated that the area of the openings 74, 76, 78, 80 will be less than half of the total area of the first plate 52, particularly the central area 70. As should be apparent from the foregoing, therefore, it is contemplated that the amount of energy from the fire 126 passing through the ventilation louver 10 may be controlled by altering the area of the openings 74, 76, 78, 80.

For clarity, the ventilation louver 10 of the present invention is provided in the body of the belly fairing 26 to serve multiple functions.

Without limiting the scope of the present invention, the ventilation louver 10 permits air pressure to equalize from the interior side of the ventilation louver 10 to the exterior side, as illustrated in FIG. 3. Specifically, the ventilation louver 10 establishes an opening from the interior of the belly fairing 26 to the exterior of the aircraft 12 so that the pressure within the belly fairing may equalize to atmospheric pressure.

In addition, the ventilation louver 10 acts as an exhaust vent. The ventilation louver 10 provides a pathway for exhausting heated air that may be generated by the operation of one or more components enclosed within the body of the belly fairing 26. This is to assist with cooling of selected components on board the aircraft 12.

Still further, the ventilation louver 10 creates a convoluted path 142 to retard the ingress of fire 126 into the compartment within the belly fairing 26 and also the fuselage 14, as discussed above, without hindering its ability to provide suitable ventilation and pressure equalization.

For purposes of assisting with an understanding of the present invention, the convoluted path 142 is understood to establish a fluid flow path from the interior side of the ventilation louver 10 to the exterior side and vice-versa. In a first instance, the fluid is air. In a second instance, the fluid is the energy associated with the fire 126. Therefore, in the first instance, the fluid flow encompasses an air flow from the interior side of the ventilation louver 10 to the exterior side, which may occur when exhausting heated air from the operation of components within the belly fairing 26. Still further, the fluid flow encompasses an air flow (e.g., the air movement) that occurs when the pressure equalizes between the interior side of the ventilation louver 10 and the exterior side. In the second instance, the fluid flow encompasses the progression of the fire 126 (i.e., the movement of the energy of the fire 126) from the exterior side of the ventilation louver 10 to the interior side.

While the ventilation louver 10 of the present invention is contemplated to provide at least the features discussed above, the present invention is not intended to be limited thereto. As should be appreciated by those skilled in the art, there are numerous other advantages offered by the ventilation louver 10 of the present invention.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A belly fairing for an aircraft, comprising:
   a body; and
   a ventilation louver disposed in the body and configured for delaying fire penetration, comprising:
      a first plate defining a first opening therein for permitting fluid flow along a first direction;
      a second plate defining a vane therein, the vane at least partially covering the first opening and directing the fluid flow along a second direction, non-parallel to the first direction; and
      a third plate defining a louvered opening therein wherein the louvered opening directs the fluid flow along a third direction, non-parallel to both the first direction and the second direction.

2. The belly fairing of claim 1, wherein the third direction is substantially perpendicular to the first direction.

3. The belly fairing of claim 1, further comprising:
   a frame comprising side walls, the frame connecting the first plate to the third plate with the second plate being positioned between the first plate and the third plate, the side walls defining a second opening therein for directing the fluid flow along the third direction, non-parallel to both the first direction and the second direction.

4. The belly fairing of claim 3, wherein the second opening comprises a plurality of second openings.

5. The belly fairing of claim 1, wherein the vane comprises a plurality of vanes.

6. The belly fairing of claim 5, wherein the first opening comprises a plurality of first openings and wherein the plurality of vanes are equal in number to the plurality of first openings.

7. The belly fairing of claim 1, wherein the louvered opening comprises a plurality of louvered openings.

8. The belly fairing of claim 1, wherein the first plate, the second plate, the third plate, and the frame are made from steel.

9. The belly fairing of claim 1, wherein said vane comprises a first flange contacting said first plate and a second flange contacting said third plate.

10. The belly fairing of claim 1, wherein said first opening is perpendicular to said louvered opening.

11. An aircraft comprising a belly fairing, the belly fairing comprising:
    a body; and
    a ventilation louver disposed in the body and configured for delaying fire penetration, comprising:
       a first plate defining a first opening therein for permitting fluid flow along a first direction;
       a second plate defining a vane therein, the vane at least partially covering the first opening and directing the fluid flow along a second direction, non-parallel to the first direction; and
       a third plate defining a louvered opening therein wherein the louvered opening directs the fluid flow along a third direction, non-parallel to both the first direction and the second direction.

12. The aircraft of claim 11, wherein the third direction is substantially perpendicular to the first direction.

13. The aircraft of claim 11, wherein the belly fairing further comprises:
    a frame comprising side walls, the frame connecting the first plate to the third plate with the second plate being positioned between the first plate and the third plate, the side walls defining a second opening therein for directing the fluid flow along the third direction, non-parallel to both the first direction and the second direction.

14. The aircraft of claim 13, wherein the second opening comprises a plurality of second openings.

15. The aircraft of claim 11, wherein the vane comprises a plurality of vanes.

16. The aircraft of claim 15, wherein the first opening comprises a plurality of first openings and wherein the plurality of vanes are equal in number to the plurality of first openings.

17. The aircraft of claim 11, wherein the louvered opening comprises a plurality of louvered openings.

18. The aircraft of claim 11, wherein the first plate, the second plate, the third plate, and the frame are made from steel.

19. The aircraft of claim 11, wherein said vane comprises a first flange contacting said first plate and a second flange contacting said third plate.

20. The aircraft of claim 11, wherein said first opening is perpendicular to said louvered opening.

* * * * *

UNITED STATES PATENT AND TRADEMARK OFFICE
CERTIFICATE OF CORRECTION

Page 1 of 1

PATENT NO. : 11,668,490 B2
APPLICATION NO. : 16/308614
DATED : June 6, 2023
INVENTOR(S) : Dean Martin Timbrell and Jean-Guy Gaudreau It is certified that error appears in the above-identified patent and that said Letters Patent is hereby corrected as shown below:

On the Title Page

Item (73) Assignee, replace "BOMBARDIER INC., Dorval (CA); AIRBUS CANADA LIMITED PARTNERSHIP, Mirabel (CA)" with -- AIRBUS CANADA LIMITED PARTNERSHIP, Mirabel (CA) --

Signed and Sealed this
Twenty-seventh Day of August, 2024

Katherine Kelly Vidal
*Director of the United States Patent and Trademark Office*